United States Patent [19]

Napolitano

[11] 3,761,520

[45] Sept. 25, 1973

[54] REARRANGEMENT OF N-ALKYL AROMATIC AMINES

[75] Inventor: John P. Napolitano, Royal Oak, Mich.

[73] Assignee: Ethyl Corporation, Richmond, Va.

[22] Filed: Feb. 14, 1969

[21] Appl. No.: 799,523

[52] U.S. Cl........... 260/578, 260/243 A, 260/244 R, 260/247.5, 260/250 R, 260/256.4 Q, 260/288 R, 260/307 D, 260/307 G, 260/308 B, 260/309.2, 260/310 R, 260/315, 260/326.15, 260/329 F, 260/329.2, 260/345.2, 260/345.3, 260/345.9, 260/347.7

[51] Int. Cl...................... C07c 87/28, C07c 87/50

[58] Field of Search........................ 260/578, 570 R

[56] References Cited
UNITED STATES PATENTS

| | | | |
|---|---|---|---|
| 2,762,845 | 9/1956 | Stroh et al. | 260/578 |
| 2,814,646 | 11/1957 | Kolka et al. | 260/578 X |
| 3,275,690 | 9/1966 | Stroh et al. | 260/578 X |
| 3,394,190 | 7/1968 | Wall et al. | 260/578 X |

FOREIGN PATENTS OR APPLICATIONS 846,226  8/1960  Great Britain .................... 260/578

OTHER PUBLICATIONS

Olah, "Friedel–Crafts and Related Reactions", Vol. II, Part I, pages 101–104 and 243 (1964).
Hart, et al., "Journal Organic Chemistry", Vol. 27, pages 116–119 (1962).

*Primary Examiner*—Robert V. Hines
*Attorney*—Donald L. Johnson

[57] ABSTRACT

N-alkyl secondary aromatic amines having at least one unsubstituted ortho position are converted to orthoalkyl primary aromatic amines by heating to a temperature of 275°–400° C. in the presence of an aluminum anilide catalyst and an olefin which corresponds in structure to the N-alkyl group, but which contains olefinic unsaturation.

9 Claims, No Drawings

REARRANGEMENT OF N-ALKYL AROMATIC AMINES

BACKGROUND

Aromatic amines alkylated in an ortho position are valuable intermediates which are used in the preparation of dyes, insecticides, herbicides, and such valuable chemicals as indole. In U.S. Pat. No. 2,814,646 there is described an efficient method for preparing orthoalkylated aromatic amines by reacting an aromatic amine having an open ortho position with an olefin in the presence of an aluminum anilide. The orthoalkylation proceeds at an even higher rate and at a lower temperature with N-alkyl aromatic amines. However, although the reaction rate with N-alkyl aromatic amines is higher, the product is a N-alkyl-2-alkyl aromatic amine and, hence, the higher reaction rate cannot be taken advantage of if the desired product is a primary aromatic amine.

SUMMARY

This invention relates to a process for converting N-alkylated secondary aromatic amines to orthoalkylated primary aromatic amines. Briefly stated, the process involves the heating of a N-alkylated secondary aromatic amine having at least one ortho position unsubstituted except by hydrogen to a temperature of 275° to about 400°C. in the presence of an aluminum anilide catalyst and, also, added olefin. The added olefin has the same structure as the N-alkyl group except that it contains olefinic unsaturation.

Some advantages of this process over the prior art methods are:

1. It makes possible the preparation of 2,6-dialkyl aromatic amines by first mono-orthoalkylating a N-alkyl aromatic amine using, for example, the method of U.S. Pat. No. 2,814,646, which reaction proceeds at a very high rate at moderate temperatures, and then converting the N-alkyl-2-alkyl aromatic amine so formed to a 2,6-dialkyl aromatic amine;

2. It makes possible the clean-cut preparation of unsymmetrical 2,6-dialkyl anilines such as 2-ethyl-6-isopropyl aniline by first preparing a N-alkyl aniline, then alkylating one ortho position with a different alkyl group using the method of U.S. Pat. No. 2,814,646, and finally, converting the N-alkyl-2-alkyl aniline to an unsymmetrical 2,6-dialkyl aniline by heating to 275°–400°C. in the presence of an aluminum anilide catalyst and additional olefin corresponding in structure to the N-alkyl radical, but containing olefinic unsaturation.

Accordingly, an object of this invention is to provide a method for converting N-alkyl secondary aromatic amines to orthoalkylated primary aromatic amines.

DESCRIPTION OF THE PREFERRED EMBODIMENTS

The above and other objects of this invention are accomplished by providing a process comprising heating an aromatic secondary amine having the formula:

$$A-NH-R_1 \quad (I)$$

in which $R_1$ is selected from the group consisting of alkyl radicals containing two to 12 carbon atoms, cycloalkyl radicals containing six to 12 carbon atoms, and alpha-branched benzyl groups containing eight to 20 carbon atoms and A is an aromatic group in which at least one nuclear position ortho to the amino group is unsubstituted except for hydrogen, to a temperature of from 275°–400°C. in the presence of an aluminum anilide catalyst and added olefinically unsaturated hydrocarbon wherein said unsaturated hydrocarbon corresponds in structure to the group $R_1$ but which contains olefinic unsaturation.

The secondary aromatic amines which may be used include both mono- and poly- nuclear aromatic amines. Also, the aryl portion may be fused with other cyclic systems including heterocyclic systems such as those containing oxygen, nitrogen or sulfur. By way of example, A in Formula I may be derived from benzene, naphthalene, anthracene, phenanthrene, indene, isoindene, benzofuran, isobenzofuran, thionaphthene, indole, isoindole, indolenine, 2-isobenzazole, 1,2-benzodiazole, 1,3-benzodiazole, indiazine, 1,3-benzoisodiazole, 1,2,3-benzotriazole, benzisoxazole, benzoxadiazole, 1,2-benzopyran, 1,4-benzopyran, 1,2-benzopyrone, quinoline, isoquinoline, 1,3-benzodiazine, 1,2-benzisoxazine, acenaphthene, fluorene, dibenzopyrrole, xanthene, thianthrene, phenothiazine, phenoxazine, naphthacene, chrysene, pyrene, triphenylene, and the like.

The aromatic group may also be substituted with other radicals as long as they do not interfere with the course of the reaction. All that is required is that the aromatic group have at least one position ortho to the amine group unsubstituted except for hydrogen. Some further examples of these include 3-methylphenyl, 4-methylphenyl, 2-tert-butylphenyl, p-chlorophenyl, p-methoxyphenyl, p-ethoxyphenyl, p-butoxyphenyl, 3,5-dichlorophenyl, 3,5-dibromophenyl, p-sec-eicosylphenyl, α-naphthyl, β-naphthyl, 4-chloro-α-naphthyl, 4-methyl-α-naphthyl, 4-tert-butyl-α-naphthyl, p-pentacontylphenyl, 2-(α-methylbenzyl)-phenyl, and and the like.

Alkyl radicals which may be substituted on the nitrogen to form the secondary amines include ethyl, propyl, isopropyl, n-butyl, sec-butyl, tert-butyl, n-amyl, isoamyl, sec-amyl, tert-amyl, n-decyl, isodecyl, sec-decyl, tert-decyl, n-dodecyl, sec-dodecyl, and the like. Useful cycloalkyl radicals are cyclohexyl, cyclooctyl, 4-tert-butyl-cyclohexyl, 4-sec-hexylcyclohexyl, and the like. Useful alpha-branched benzyl groups include α-methylbenzyl, α,α-dimethylbenzyl, α-ethylbenzyl, α-methyl-4-tert-butylbenzyl, α-methyl-4-sec-dodecylbenzyl, α-methyl-2,3-benzobenzyl, and the like.

It is apparent from the foregoing what aromatic secondary amines can be used in the process. By way of futher example, suitable amines include N-ethylaniline, N-ethyl-2-ethylaniline, N-n-propylaniline, N-n-propyl-2-ethylaniline, N-cyclohexylaniline, N-cyclohexyl-α-naphthylamine, N-n-dodecyl-p-toluidine, N-cyclooctyl-p-pentacontylaniline, N-(4-tert-butylcyclohexyl)-p-chloroaniline, N-(α-methylbenzyl)-3,5-di-bromoaniline, N-(αα-dimethyl-4-sec-nonylbenzyl)aniline, N-cyclohexyl-2-cyclohexylaniline, N-cyclohexyl-4-cyclohexylaniline, N-ethyl-7-aminoindene, N-n-butyl-7-amino-4,6-dibromoindene, N-ethyl-4-aminobenzofuran, N-n-propyl-4-aminobiphenyl, N-n-octyl-p-anisidine, N-cyclohexyl-7-aminoindole, N-ethyl-7-amino-4-nitroisobenzofuran, N-(α-methylbenzyl)-4-amino-7-acetoxyindolenine, N-ethyl- 7-amino-4-methoxyisothionaphthene, N-cyclooctyl-4-aminobenzoisoxazole, N-(4-sec-hexylcyclohexyl)-7-amino-4-iodobenzoisoxazole, N-sec-butyl-6-aminocoumarin, N-ethyl-6-amino-8fluorocoumarin, N-ethyl-6,8-dichloro-β-naphthylamine, N-ethyl-4-nitro-α-naphthylamine, N-ethyl-6-aminoquinoline, N-n-dodecyl-4-aminoacenaphthene, N-cyclohexyl-4-amino-7-methylacenaphthene, N-ethyl-7-aminoquinazoline, N-n-propyl-7-aminoquinoxaline, N-sec-octyl-7-aminophthalazine, N-ethyl-1-aminofluorene, N-n-dodecyl-4-sec-amyl-2-aminofluorene, N-cyclohexyl-2-amino-6,8-difluorofluorene, N-ethyl-α-aminoanthracene, N-n-butyl-α-amino-4-phenylanthracene, N-cyclooctyl-β-amino-4-(2,4-di-sec-heptylphenyl)anthracene, N-(3,5-diisopropylcyclohexyl)-β-aminoanthracene, N-n-hexyl-3-aminophenanthrene, N-n-decyl-3-amino-8-ethoxyphenanthrene, N-ethyl-2-amino-7-chlorophenanthrene, N-(α-methylbenzyl)-1-aminoxanthene, N-ethyl-2-aminophenazine, N-ethyl-1-aminonaphthacene, N-ethyl-2-aminochrysene, N-n-hexyl-1-aminochrysene, N-ethyl-2-aminopyrene, and N-cyclooctyl-2-aminotriphenylene.

The aluminum anilide catalyst can be such that the anilide groups are the same as the aromatic amine or they may be different. They are readily prepared by reacting aluminum turnings or granular aluminum with an aromatic primary or secondary amine at a temperature from about 125°–200°C. Hydrogen evolves and an aluminum anilide type catalyst forms.

The catalyst can also be made by reacting an aluminum alkyl such as triethyl aluminum with a primary or secondary aromatic amine. Care should be taken to avoid contact with oxygen since many aluminum alkyls are pyrophoric.

The amount of catalyst can vary over a wide range. In general, good results are obtained when there is enough catalyst in the reaction mixture to provide one gram atom of aluminum for each 5–25 gram moles of aromatic amine. A preferred range is one gram atom of aluminum for each 7.5–20 GRAM MOLES OF AROMATIC AMINE.

The reaction is conducted in the presence of added olefinically unsaturated hydrocarbon which corresponds in structure to the non-aromatic groups bonded to amine nitrogen, but which contains olefinic unsaturation. The unsaturation should be at the carbon atom which corresponds to the one bonded to nitrogen in the non-aromatic nitrogen substituent. For example, if the non-aromatic group is ethyl, the olefinically unsaturated hydrocarbon will be ethylene. The following table further illustrates the olefin added with different N-substituents.

| N-substituent | Olefin |
| --- | --- |
| N-propyl | propylene |
| isopropyl | propylene |
| n-butyl | butene-1 |
| t-butyl | isobutylene |
| n-dodecene | dodecene-1 |
| cyclohexyl | cyclohexene |
| α-methylbenzyl | styrene |
| αα-dimethylbenzyl | α-methylstyrene |

The amount of added olefin can vary from about 0.1 to 100 moles per mole of aromatic amine. Generally, good yields are obtained when from 0.5 to 20 moles of added olefin are used per each mole of aromatic amine.

The reaction proceeds at temperatures from about 275°–400°C. The reaction rate is fairly slow at 275°C., so a preferred temperature range is from about 300°–400°C. At these temperatures the vapor pressure of the reactants is quite high and depends to some extent on the reactor loading.

A feature of the process is that it allows the preparation of unsymmetrical 2,6-dialkyl aromatic amines. For example, N-ethylaniline can be first reacted with propylene at a temperature below 275°C. in the presence of an aluminum anilide catalyst and will rapidly form N-ethyl-2-isopropylaniline. When the propylene is removed and replaced with added ethylene and the mixture heated to a temperature of 275°C. this intermediate is converted to 2-ethyl-6-isopropylaniline, an unsymmetrical 2,6-disubstituted aniline.

The following examples serve to illustrate the manner in which the process is conducted. All parts are by weight unless otherwise specified.

EXAMPLE 1

In a high pressure reaction vessel fitted with stirrer and heating means was placed 361 parts of N-ethylaniline. The vessel was flushed with nitrogen. To this was added a solution of 27.4 parts of triethyl aluminum in 33 parts of toluene over a 55 minute period at 70°–100°C. The evolved ethane was allowed to vent. The vessel was then sealed and pressurized to 400 psig at 120°C. with ethylene. While stirring, the mixture was heated, and after 5 minutes the temperature was 188°C. and the pressure 380 psig. Ethylene was added until the pressure reached 800 psig. After 10 more minutes the temperature had attained 232°C. and the pressure dropped to 80 psig. Ethylene was again added until the pressure reached 800 psig. During the next one hour and 38 minute period the temperature was held at about 226°C. and the pressure dropped only to 600 psig, indicating completion of alkylation. Analysis of the reaction product at this point showed it to contain 0.26 percent N-ethylaniline, 85.94 percent N-ethyl-2-ethylaniline, and minor amounts of various other products. The reaction mixture was then heated to 330°C. and held at this temperature for 17 hours under an ethylene pressure of about 350–800 psig. The reaction mixture then analyzed 54.9 percent of 2,6-diethylaniline, 5.37 percent o-ethyl-N-ethylaniline, 6.36 percent 2,4,6-triethylaniline, 4.8 percent o-ethylaniline, and minor amounts of various other products. The results showed that the N-ethyl group was converted to an o-ethyl group.

EXAMPLE 2

In a pressure reaction vessel is placed 10 mole parts of N-dodecylaniline and 27 parts of granular aluminum. The vessel is sealed and heated to 210°C. After 15 minutes, it is cooled and vented. There is then added 20 mole parts of 1-dodecene and the vessel is sealed. While stirring, it is heated to 370°C. and stirred at this temperature for 18 hours. It is then cooled and vented. The product is washed with a 20 percent aqueous sodium hydroxide to remove the catalyst and then twice with a saturated sodium chloride solution. It is dried over anhydrous magnesium sulfate. Distillation at reduced pressure results in a good yield of 2,6-di(2-dodecyl)aniline.

Other N-substituted anilines and their olefin counterpart can be employed in the above example with good results. For instance, N-n-butylaniline plus butene-1 forms 2,6-di(2-butyl) aniline. Likewise, N-cyclohexyl plus cyclohexene will form 2,6-dicyclohexylaniline. Also, N-(α-methylbenzyl)aniline plus styrene forms 2,-6-di(α-methylbenzyl)aniline. Likewise, N-isopropylaniline plus propylene yields 2,6-diisopropylaniline. The use of N-ethyl-β-naphthylamine plus ethylene results in 1,3-diethyl-β-naphthylamine. Likewise, N-cyclohexyl-β-naphthylamine plus cyclohexene forms 1,3-dicyclohexyl-β-naphthylamine. Similarly, N-(α-methylbenzyl)-α-naphthylamine plus styrene forms β-(α-methylbenzyl)-α-naphthylamine.

EXAMPLE 3

In a pressure reaction vessel is placed 10 mole parts of N-ethyl-3-aminophenanthrene. To this is added a 10 per cent toluene solution of one mole part of triethyl aluminum over a 1 hour period at 75°–100°C. The vessel is then sealed and pressurized to 800 psig with ethylene. It is heated to 300°C., and then over a one hour period heated to 400°C., while maintaining pressure at 600–800 psig with ethylene. It is stirred at 385°–400°C. for 4 hours and then cooled, yielding as the principal product 2,4-diethylaminophenanthrene.

Other aromatic amines having at least one ortho position unsubstituted can be used in the above example with similar results. For instance, N-ethyl-α-aminoanthracene forms 2-ethyl-α-aminoanthracene. N-ethyl-2-aminopyrene forms 1,3-diethyl-2-aminopyrene. N-ethyl-1-aminochrysene forms 2-ethyl-1-aminochrysene.

In like manner, other N-substituted aromatic amines and their olefin counterpart can be used, such as N-n-propyl-aromatic amines plus propylene; N-sec-octyl aromatic amines plus 1-octene; N-n-dodecyl aromatic amines plus 1-dodecene; N-α-methylbenzyl aromatic amines plus styrene; N-(α-methyl-4-sec-dodecylbenzyl) aromatic amines plus 4-sec-dodecyl styrene; N-cyclohexyl aromatic amines plus cyclohexene; and N-(4-sec-hexylcyclohexyl) aromatic amines plus 4-sec-hexylcyclohexene.

EXAMPLE 4

An unsymmetrical 2,6-disubstituted aniline is prepared as follows. In the vessel of Example 1 is placed 10 mole parts of N-cyclohexyl amine. To this is added a 20 per cent toluene solution of 0.7 mole and triethyl aluminum at 75°–100°C. over a 30 minute period. The vessel is sealed and pressurized to 500 psig with ethylene. It is heated to 220°C. and stirred at this temperature for 1 hour while maintaining 500 psig ethylene pressure. It is then cooled to 50°C. and vented. Then, 20 moles of cyclohexene are added and the vessel sealed and heated to 350°C. It is stirred at 350°–400°C. for 8 hours, following which it is cooled and washed with a 20 per cent sodium hydroxide solution, followed by a saturated sodium chloride solution. The principal product recovered by distillation is 2-ethyl-6-cyclohexyl aniline.

The foregoing general procedure can be used to prepare a variety of unsymmetrical aromatic amines by first alkylating the N-substituted amine, having both positions ortho to the amino group unsubstituted, with a group different from that on the amino nitrogen and then heating to 275°–400°C., preferably 300°–400°C., in the presence of an olefin corresponding in structure to the non-aromatic nitrogen substituent.

As previously stated, the aromatic amines produced are useful as intermediates in the manufacture of dyes, insecticides, herbicides, and chemicals such as indole. They can be used as antiozonants in rubber and antiknock agents in gasoline. For example, in U.S. Pat. No. 3,322,810 there is described certain 2,6-dialkyl isothiocyanates useful as pesticides. These are made by reacting carbon disulfide with a 2,6-dialkyl aniline which can be made by the present process.

I claim:

1. A process comprising heating a compound having the formula:

in which $R_1$ is selected from the group consisting of alkyl radicals containing two to 12 carbon atoms, cycloalkyl radicals containing six to 12 carbon atoms, and α-methyl and αα-dimethyl benzyl groups containing eight to 20 carbon atoms, and A is an aryl group in which at least one nuclear position ortho to the amino group is unsubstituted except for hydrogen, to a temperature of from 275°–400°C. in the presence of an aluminum anilide catalyst and added olefin wherein said olefin corresponds in structure to the group $R_1$ but which contains olefinic unsaturation.

2. The process of claim 1 in which A is the phenyl group.

3. The process of claim 1 in which A is the 2-ethylphenyl group.

4. The process of claim 3 in which $R_1$ is an ethyl radical and said olefin is ethylene.

5. The process of claim 1 comprising heating an aniline having the formula:

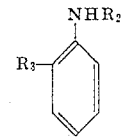

wherein $R_2$ and $R_3$ are different groups selected from the class consisting of alkyl radicals containing two to 12 carbon atoms, cycloalkyl radicals containing six to 12 carbon atoms, and α-methyl and α, α-dimethyl benzyl groups containing eight to 20 carbon atoms, to a temperature of from 275°–400°C. in the presence of an aluminum anilide catalyst and added olefin wherein said olefin corresponds in structure to the group $R_2$ but which contains olefinic unsaturation.

6. The process of claim 5 wherein $R_2$ is the ethyl group, $R_3$ is the methyl group, and said olefin is ethylene.

7. The process of claim 5 wherein $R_2$ is the ethyl group, $R_3$ is an isopropyl group, and said olefin is ethylene.

8. The process of claim 5 wherein $R_2$ is the ethyl group, $R_3$ is a sec-butyl group, and said olefin is ethylene.

9. The process of claim 5 wherein $R_2$ is the ethyl group, $R_3$ is the tert-butyl group, and said olefin is ethylene.

* * * * *